US012413431B1

(12) United States Patent
Ziv et al.

(10) Patent No.: US 12,413,431 B1
(45) Date of Patent: Sep. 9, 2025

(54) APPROVAL-BASED DISTRIBUTED LEDGER SYSTEM FOR ENSURING INTEGRITY OF DIGITAL MANUFACTURING THREADS AND TECHNICAL DATA PACKAGES

(71) Applicant: United States of America as Represented by the Secretary of the Navy, Arlington, VA (US)

(72) Inventors: Scott Ziv, Gaithersburg, MD (US); Michael Ziv, Spotsylvania, VA (US)

(73) Assignee: The United States of America, represented by the Secretary of the Navy, Washington, DC (US)

( * ) Notice: Subject to any disclaimer, the term of this patent is extended or adjusted under 35 U.S.C. 154(b) by 228 days.

(21) Appl. No.: 18/164,375

(22) Filed: Feb. 3, 2023

Related U.S. Application Data

(60) Provisional application No. 63/315,869, filed on Mar. 2, 2022.

(51) Int. Cl.
*H04L 9/00* (2022.01)
*H04L 9/08* (2006.01)
*H04L 9/32* (2006.01)

(52) U.S. Cl.
CPC .............. *H04L 9/50* (2022.05); *H04L 9/0825* (2013.01); *H04L 9/3247* (2013.01)

(58) Field of Classification Search
None
See application file for complete search history.

(56) References Cited

U.S. PATENT DOCUMENTS

| 10,373,159 | B2 | 8/2019 | Ardashev et al. |
| 2019/0180291 | A1 | 6/2019 | Schmeling et al. |
| 2020/0106797 | A1* | 4/2020 | Christian ............ H04L 63/1483 |
| 2021/0256580 | A1 | 8/2021 | Norman |
| 2021/0342957 | A1* | 11/2021 | Small ................. G06Q 30/0185 |

FOREIGN PATENT DOCUMENTS

| JP | 6999023 B2 * | 2/2022 | ......... G06F 16/2255 |
| WO | WO-2019015904 A1 * | 1/2019 | ......... G06F 16/2365 |

* cited by examiner

*Primary Examiner* — Jeffrey C Pwu
*Assistant Examiner* — Mayasa A. Shaawat
(74) *Attorney, Agent, or Firm* — Jesus J. Hernandez; U.S. Department of the Navy, Office of the General Counsel

(57) ABSTRACT

Exemplary embodiments provide a distributed ledger system that may comprise a ledger network configured to have various entry sequences, wherein a sequence is associated with an element intended for manufacturing and an entry in the sequence is associated with an element file packet with instructions for undertaking the manufacturing of the element. The system may also comprise: at least one submitter node configured to submit a proposed entry transaction to the ledger network, wherein the proposed entry transaction includes a revised element file packet; and at least one approval node configured to review the proposed entry transaction and provide approval if threshold criteria are met. If the approval is provided by the at least one approval node, the proposed entry transaction and the revised element file packet become a latest entry and latest element file packet in the sequence. The system may also comprise at least one fabrication node and at least one end point.

16 Claims, 6 Drawing Sheets

APPROVAL-BASED DISTRIBUTED LEDGER SYSTEM FOR ENSURING INTEGRITY OF DIGITAL MANUFACTURING THREADS AND TECHNICAL DATA PACKAGES

CROSS-REFERENCE TO RELATED APPLICATIONS

This application claims the benefit of U.S. Provisional Application No. 63/315,869 filed Mar. 2, 2022, titled "Approval-Based Distributed Ledger System for Ensuring Integrity of Digital Manufacturing Threads and Technical Data Packages," incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to additive manufacturing and blockchain technologies. Alternative embodiments may be implemented in similar technologies.

BACKGROUND

Digital manufacturing, including additive manufacturing (AM), plays a key role in reducing supply chain delays, improving fleet readiness, and allowing parts designed in different locations to be produced in the field. This introduces a challenge in ensuring: (i) that information is reliably transmitted across unknown network topologies; and (ii) that well-designed engineering data is not tampered with in transit, either by human error or malicious intent. With conventional technologies, information is provided by a centralized server, which provides a single source of truth but is limited by uptime for transmission and could be a single point of failure or corruption by insider threat.

SUMMARY

Exemplary embodiments provide an approval-based distributed ledger system. According to an example embodiment, a distributed ledger system may comprise a ledger network configured to have various entry sequences, wherein a sequence is associated with an element intended for manufacturing and an entry in the sequence is associated with an element file packet with instructions for undertaking the manufacturing of the element. The system may also comprise: at least one submitter node configured to submit a proposed entry transaction to the ledger network, wherein the proposed entry transaction includes a revised element file packet; and at least one approval node configured to review the proposed entry transaction and provide approval if threshold criteria are met. If the approval is provided by the approval node, the proposed entry transaction and the revised element file packet become a latest entry and latest element file packet in the sequence. The system may also comprise: at least one fabrication node configured to communicate with the ledger network and obtain the latest entry and the latest element file packet from the sequence; and at least one end point configured to obtain the latest element file packet from the fabrication node and undertake the manufacturing of the element.

BRIEF DESCRIPTION OF DRAWINGS

The accompanying figures are included to provide a further understanding of example embodiments, and are incorporated in and constitute part of this specification. In the figures.

DETAILED DESCRIPTION

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to an approval-based distributed ledger system for AM purposes. However, it should be noted that the example embodiments shown and described herein are meant to be illustrative only and not limiting in any way. As such, various modifications will be apparent to those skilled in the art for application to a wide range of other digital manufacturing systems based on technologies other than the above, which may be in various stages of development and intended for future replacement of, or use with, the above described method or apparatus.

Digital threads permeate numerous facets of modern life. As a new technology develops, digital threads become more important in an interconnected world. Correspondingly, as systems become more distributed, ensuring the integrity of digital threads is a valuable new frontier. The integrity of a digital thread is ensured when the portion of the thread that was sent is identical to the portion of the thread that was received.

The goal of the invention is to allow a single source of truth for manufacturing (e.g., AM) file packets across a distributed network. The invention described uses an approval-based distributed ledger to secure a digital thread against tamper. Blockchain technologies allow a single source of truth. Across a distributed network, blockchain technologies can ensure both uptime and resilience in ways that centralized servers cannot. The described approval-based distributed ledger system is implemented in a blockchain architecture. Nonetheless, alternative embodiments can be realized in similar architectures.

Figure 1:
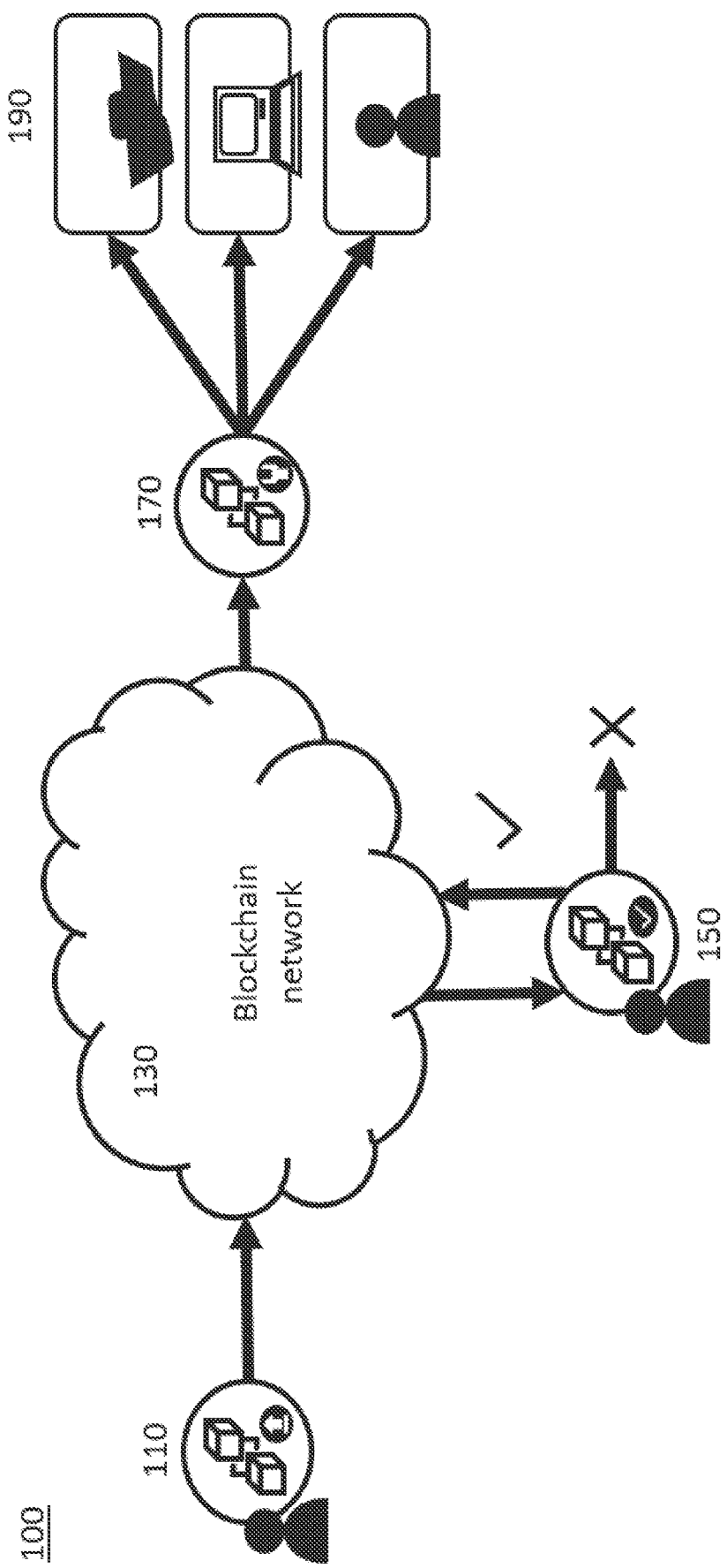
FIG. 1 is an approval-based distributed ledger system according to an example embodiment.

FIG. 1 is an approval-based distributed ledger system according to an example embodiment. The approval-based distributed ledger system 100 uses a node structure to facilitate each transaction. As previously mentioned, utilization of a node structure is critical to maximize end-to-end digital thread integrity and tamper resistance. The approval-based distributed ledger system 100 improves on the conventional approach, which relies on the end user to ensure that files used are the most current and assumes that nobody has tampered with the files (either via malicious intent or simple error).

The approval-based distributed ledger system 10 comprises three functions assigned to nodes linked together via a blockchain network 130. The three nodes include: a submitter node 110; an approval node 150; and a fabrication node 170. Each node may be a single node, or a plurality of nodes. For the sake of explanation, the example embodiments discussed below will focus on each being a single node. The three nodes can be any computing device that is able to access, send, and/or receive information on a network. For example, the nodes may be desktop computers or servers. In some embodiments, the nodes can be part of a cloud-based network. In other embodiments, the network may be part of an overarching closed and secured network.

The blockchain network 130 may comprise various blockchains. The blockchains may be interconnected or independent of each other. Each blockchain may comprise one or more chains. Each chain may be assigned to a particular part or element for desired manufacturing at an end point 190. The end point 190 is the back-end of the approval-based distributed ledger system 100. Additional details on the blockchain network 130 is provided below in the discussion of FIG. 3.

The approval-based distributed ledger system 100 commences at the submitter node 110. At the submitter node 110, a submitter may download a latest version of an approved file packet. The file packet may correspond to a particular part or element that can be manufactured at an end point 190. The latest approved file packet version is itself associated with a block in the chain dedicated to the particular part that may be manufactured. The download request may be limited to the most recent revised file packet or, in some example embodiments, to a desired previous revision. In some embodiments, the download request may include a decompression of the file packet prior to or upon downloading. Once the most recent file packet is downloaded at the submitter node 110, it can be opened in CAD or some similar editing software (e.g., Solidworks).

The submitter may be an end user or an intermediary user. The submitter may also be an actual person or a computer program (e.g., artificial intelligence). In some embodiments, the submitter may be staff of naval fleet forces, space fleet forces, or other vessel or vehicle in an isolated location. The submitter may modify the latest approved file version in various ways, such as providing an update to all or part of the data, adapting the part to a new use or AM device, and/or use of a new file format. In some embodiments, the blockchain will limit some of the elements that may be modified.

Once a new file has been developed at the submitter node 110, the submitted node 110 may forward to the blockchain network 130 a new revised file packet as a "proposed transaction" block. The proposed transaction is not permanently added to a chain and/or blockchain in the blockchain network 130. Instead, the proposed transaction is temporarily added to a waiting room associated with the chain and/or blockchain in the blockchain network 130. This waiting room is known as a "memory pool." The memory pool is propagated along with a chain or blockchain prior to being validated or hashed into a permanent block. In some embodiments, there may be submission requirements or preconditions at the submitter node 110 associated with a proposed transaction prior to forwarding to the memory pool. For example, the new revised file packet may need to be compressed prior to forwarding to the memory pool. In another example, the new revised file packet may need to be revised by a third party prior to being sent to the memory pool as a proposed transaction. Additional discussion on the memory pool is provided below with respect to FIG. 3.

In some embodiments, the submitter node 110 may be or include a graphical user interface (GUI) to facilitate interaction with a person assuming the role as a submitter. In some embodiments, the GUI will allow the submitter to modify existing parts by propagating the existing chain and allowing the submitter to: (i) select a part; (ii) download and decompress the associated file packet of the part; (iii) open the file packet in CAD or similar type of editing software; (iv) make desired revisions to the file packet; (v) recompress the file packet; and (vi) submit the revised file packet as a proposed transaction to the blockchain network 130. The GUI may also send the file packet directly to the next step of the approval-based distributed ledger system 100. In some embodiments, the GUI may also allow the submitter to subscribe to a preexisting blockchain and begin a new parallel chain associated with a unique part that is still associated with the governing blockchain (rather than a revision within the same chain).

Once a proposed transaction is temporarily added to the memory pool, a notification may be sent to the approval node 150. In some embodiments, the approval node 150 may receive an immediate notification of a proposed transaction from blockchain network 130. In other embodiments, the approval node 150 may occasionally query the blockchain network 130 at predetermined time intervals to ascertain if there is a temporary pending transaction. A decision maker at the approval node 150 reviews the revised file packet associated with the proposed transaction. The approval node 150 then approves or rejects the revised file packet. The approval node 150 may use one or more of a number of tools to compare the revised file packet to the last approved file packet. In one example embodiment, the last approved file packet may be extrapolated from the blockchain network 130 by reviewing previously received proposed transactions and their associated revised file packets. In another example embodiment, the approval node 150 itself may maintain a repository of all previous file packet versions.

The decision maker, or "approver," at the approval node 150 may be an actual person, a chain of approvers, or a computer program (e.g., artificial intelligence). In example embodiments relying on a person, the approval node 150 may include evaluation tools, as mentioned above. File packets include complex instructions for undertaking manufacturing processes at the end point 190. Additional discussion on this topic is provided with respect to FIG. 2. Due to the complexity of the file packets, one of the tools at the approval node 150 may be an evaluation tool that highlights changes to the file packet. Such a tool may be a visual illustration that overlays old geometry over new and highlights all geometric changes attributable to a new revised file packet. Another example tool may identify differences in the values of a wide range of numerical or categorical parameters. Such tools can assist a person acting as a decision maker to quickly understand proposed changes in the new revised file packet. Such tools may also assist a chain of approvers or even a computer program.

If the approval node 150 rejects the new revised file packet, then the process for the rejected new revised file packet may conclude. In an example embodiment, the proposed transaction may sit indefinitely in the memory pool. In some embodiments, the rejected transaction may be configured to expire and be removed from the memory pool after a predetermined amount of time. The exact predetermined amount of time may be application specific. In other example embodiments, the submitter and/or the submitter node 110 can be informed about the rejection for situational awareness and/or to permit manual removal of the rejected proposed transaction.

Figure 3:
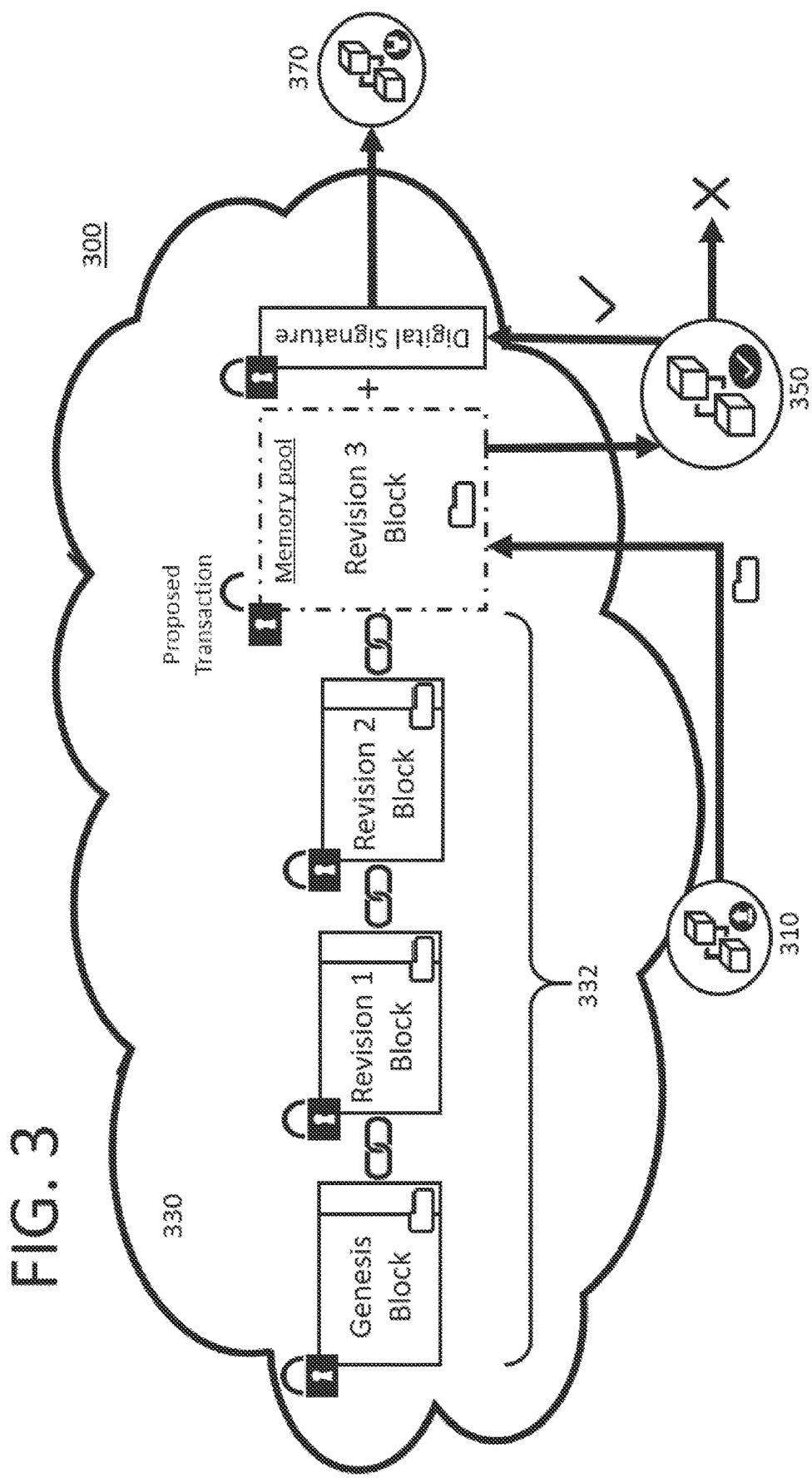
FIG. 3 is a blockchain network in an approval-based distributed ledger system according to an example embodiment.

On the other hand, if the approval node 150 accepts the new revised file packet, then the proposed transaction in the memory block is made permanent by being mined into a new block in the appropriate chain or blockchain. This may be done through the use of a digital signature that formally approves the transaction in the blockchain network 130. FIG. 3 illustrates this process in greater detail, discussed further below. The above described approval process is the only way to append changes to a chain or blockchain in blockchain network 130 of the approval-based distributed ledger system 100.

Once the temporary transaction in the memory block of the blockchain network 130 is made permanent, the approval-based distributed ledger system 100 may move on to the fabrication node 170. The fabricator node 170 generates the tool operational commands required to manufacture a part. The fabricator node 170 uses the part's respective file packet from the blockchain network 130 to undertake a "slicing" operation. In additive manufacturing, slicing is the process of converting a model (as defined in the file packet) into layers and/or a set of instructions for 3D printing (or similar operation).

The fabrication node 170 is responsible for reading and subsequently manufacturing the parts that are approved on the blockchain network 130. More specifically, the fabrication node 170 downloads the most up-to-date approved block from the blockchain network 130 and presents an end user with a catalog of parts to select from. In some example embodiments, the manufacturing at the end point 190 may take place automatically after notice from the fabrication node 170. In other example embodiments, the fabrication node 170 may present the catalog of parts to a user at an end point 190 through a GUI to select from the list of approved parts. The discussion below on FIG. 4 further elaborates on the GUI feature.

When a user selects a part for manufacturing, the part may be automatically sliced on the fabrication node 170. The part is sliced according to the verified settings and geometry from the newly added revised file packet. The fabrication node 170 may not use a revised file packet that still resides in the memory pool or that has been rejected at the approval node 150.

The fabrication node 170 may automatically check the status of the file packet for a particular part it supplies through the blockchain network 130. If a part has no associated chain or blockchain within the blockchain network 130, it will not be recognized by the fabricator node 170. An unrecognized part will also not appear in an associated GUI at an end point 190.

The fabrication node 170 may be associated with different end points 190. Each end point 190 may have its own respective manufacturing device, such as an AM printer. End points can be smaller computing elements than the respective nodes of the approval-based distributed ledger system 100. For example, the end points 190 may be integrated processors. Also, the end points 190 may be an AM machine residing in a vessel, a computing center, or an individual user in a laboratory or other setting. The fabrication node 170 may know each end point 190 and undertake toolpath processing for each. An approved revision block may have process definitions for approved AM machines at predetermined end points 190.

In some embodiments, the fabrication node 170 may download from the blockchain network 130 an entire blockchain (or set of chains) for a particular part. This may include previous blocks and the newest block alongside their respective associated file packets. Noting the high bandwidth requirements of such an approach, alternative embodiments may store "off-chain" portions of a desired blockchain by associating aspects of the blockchain to an encrypted link. Another approach is storing at the fabrication node 170 only the changes made by the revision file packet instead of the entire revision file packet and allowing the end points 190 to "rebuild" the most current revision using a combination of previous versions. In yet another alternative embodiment, the fabrication node 170 may subdivide a specific manufacturing platform into multiple chains in a blockchain.

In some embodiments, each end point 190 may be associated with predetermined parts for printing. Each chain in a blockchain may contain a list of all approved parts. These may be represented by a simplified graphic and name. The fabrication node 190 may initially query as to what chain or chains in a blockchain network 130 a particular end point 190 may want to subscribe to. Such a subscription, for example, may be determined based on characteristics of an end point (e.g., a specific hull number). In this manner, the only parts available to a user at an end point 190 are pre-assigned parts.

Figure 2:
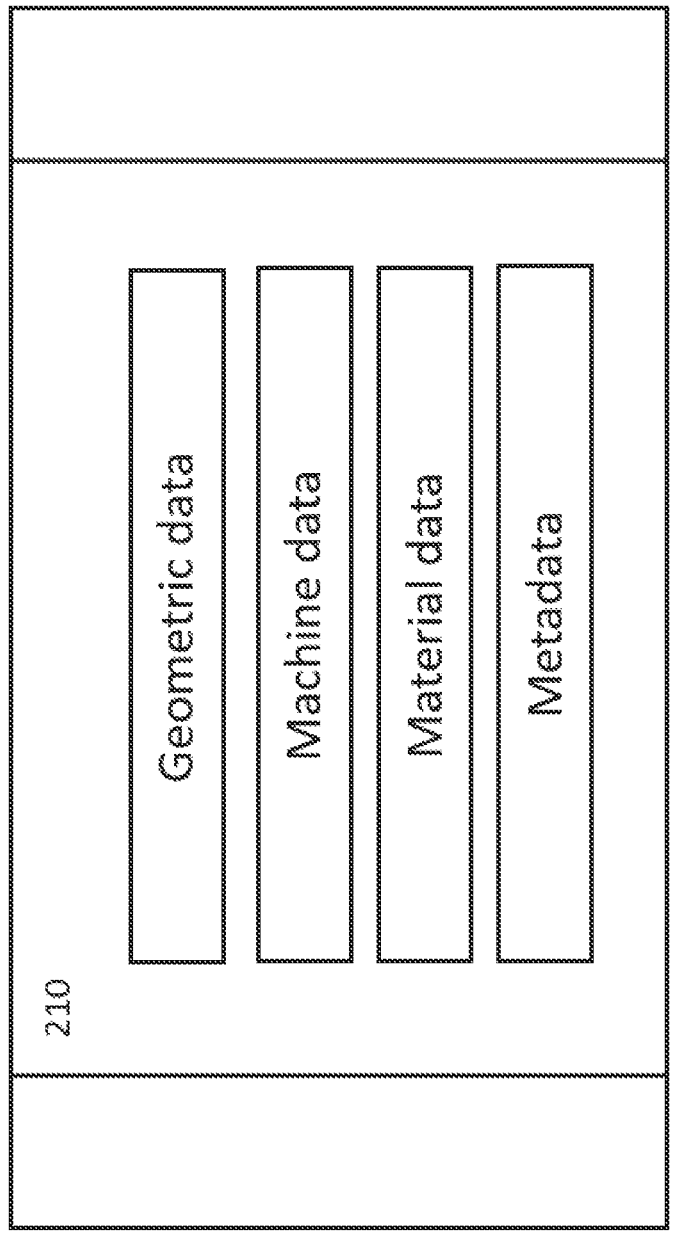
FIG. 2 is a conceptual diagram of a file packet of an approval-based distributed ledger system according to an example embodiment.

FIG. 2 is a conceptual diagram of a file packet of an approval-based distributed ledger system according to an example embodiment. The approval-based distributed ledger system may use file packets in the structure of file packet 200. The file packet 200 may be configured, conceptually, to include the elements in file format 210. The file format 210 may be Additive Manufacturing File format (AMF), an open standard for describing objects for additive manufacturing processes. In other embodiments, the file format 210 may be a standard CAD file, a standardized file format according the standard issued by the American National Standards Institute (ANSI) or other governing body, or a unique in-house file format.

The file format 210 encompasses technical data packages. This includes geometric data, machine data, material data, and metadata. The geometric data may be a table of points that define the geometry, location, scale and physical features of a part. The machine data may be machine and process specific information for the part to be manufactured. In some example embodiments, the machine data may include speed, feed rates, re-coater speed, acceleration, layer height, and/or infill. The material data may define the materials and material-specific information used to produce the part. In some example embodiments, the material data may include spindle speed, nozzle/bed temperature, laser power, and/or scan speed. The metadata may be important information not included in the geometry, machine or material data files. In some example embodiments, the metadata may include part name, file size and version, and/or date and time. In some embodiments, the metadata may be optional.

FIG. 3 is a blockchain network in an approval-based distributed ledger system according to an example embodiment. The blockchain network 300 may be made up of one or more blockchains 330. The blockchain 330 may be made up of one or more chains 332. Though not illustrated, a blockchain 330 with more than one chain 332 may have said chains interconnected to form a cross-cutting web. Each chain 332 is associated with a particular part to be manufactured. Each chain 332 includes the original file packet and all subsequent revisions, along with the full approval chain for each revision. This improves on conventional processes through: (i) approval accountability for changes and (ii) end-to-end configuration control. This approach directly links a manufactured part to an approved part. The blockchain 330 is, for all practical purposes, immutable (cannot be easily changed). This ensures that the approved file packet is also the file packet that is available to a user at an end point. Coupling this feature with the assignment of end nodes, a significant degree of end-to-end tamper protection is achieved.

As shown in FIG. 3, the first block in a chain 332 is a genesis block. The file packet at the genesis block contains data that establishes governing parameters of a part. Each subsequent block following the genesis block is a "revision" block that is hashed to the chain 332. Each revision block comprises a revised version of the file packet. Genesis blocks may be created by approver node 350 earlier in the process. A genesis block may not be created via the submitter node 310. Genesis blocks may encompass a larger scope than a revision block. All subsequent revision blocks in a chain 332 are created by submitters in the submitter node 110.

In some example embodiments, any blocks in chain 332 may be interrelated with a block in another chain within a blockchain 330. In some example embodiments, a genesis block may be associated with different parts, such that a blockchain 330 includes one genesis block with multiple chain branches—or "streams". In such a blockchain configuration, a submitter may submit both revised parts in one stream and related/associated parts in another stream—all of which may be tied to the same genesis block. In such an example embodiment, the genesis block can be directed to a specific category (e.g., an "engine bracket") and each stream can be directed to a specific type (e.g., a diesel engine stream, an EV engine stream). While a submitter may not create the genesis block, the submitter may, instead, subscribe to a pre-existing chain and its related stream (such as chain 332) and submit a proposed transaction for a related/associated part to create a new stream in the genesis block. In such an embodiment, a submitter may use the same CAD software to generate files and documentation necessary for manufacturing. Such a step may be aided by a GUI that allows a user to select from the file packet any desired geometric data, machine data, material data, metadata, and/or any other data required by approval node 350.

Since all blocks, genesis and revision blocks alike, are hashed to the chain, some example embodiments may allow a user at an end point to access older versions. Along those lines, some example embodiments may blacklist a prior revision block when a new revision block is hashed. This forecloses an outdated file packet associated with an earlier revision block from being manufactured.

As previously stated with reference to FIG. 1, a proposed revision block and associated new file packet may be submitted through the submitter node 310 and parked in a memory pool of the blockchain 330 in FIG. 3. Any pending proposed transaction in the memory pool of the chain 332 may be picked up by the approval node 350. The approval node 350 may undertake an automatic check for a proposed transaction awaiting approval. In some embodiments, the approval node 350 may give a human user a notification through the use of a GUI or a pop-up announcement. In some embodiments, if a submitter needs the approval of a proposed transaction to be expedited, the submitter can directly inform an approver at the approval node 350 through a parallel communication means.

The approval node 350 may accept or reject the proposed revision block residing in the memory pool. To accept the proposed revision block, the approval node 350 may associate a private key to the blockchain network 300 and/or blockchain 330. A digital signature may be used to associate the private key, as illustrated in FIG. 3. In some example embodiments, the private key may be associated with a person based on his or her membership in an organization, department, or agency. In other example embodiments, any comparable hashing mechanism suitable for a blockchain or a distributed ledger system may be used.

In alternative embodiments, there may be a chain of approval or a multi-approver process. In such an embodiment with multiple approvers, a private key may be assigned to each such that there are multiple private keys. In yet another embodiment, a private key may be specific to a particular chain 332, blockchain 330, or blockchain network 330.

If the approval node 350 approves the revised file packet, then the proposed transaction is accepted and the revision block is added to the chain 332. This is accomplished when the revision block is hashed to the chain 332 with the receipt of the digital signature. The newly added revision block will contain the revised file packet. The data in the file packet may contain the new or revised parameters.

On the other hand, if the approval node 350 rejects the revised file packet, then the proposed transaction is not accepted and the process may conclude. This may be implemented in different ways. In one example embodiment, the rejection of the proposed transaction is logged into the blockchain 330 by using a separate chain or a stream for pending transactions, while using the main chain 332 for finally approved transactions. In another example embodiment, a flag is added at the approval node 350 as a threshold for hashing. Absence of the flag will prevent any hashing. In yet another example embodiment, an off-chain mechanism for sharing proposals may be implemented, such that blockchain 330 and/or blockchain network 300 are only involved after a proposed transaction is accepted. As a result of any of these embodiments (as well as any other possible forms of notification), the submitter node 310 may know if a proposed transaction was rejected since the file packet will not appear in the chain 332 or the memory pool. In some embodiments, a rejection may be checked in an automated way and integrated into a GUI. In some embodiments, rejected submissions may stay in the memory pool and the memory pool may serve as a log of rejected submissions. A separate system may also copy information in the memory pool and log it for future evaluation as a means to create a permanent record of rejected transactions.

In example embodiments involving a genesis block with multiple streams, the approval node 350 may receive a notification that the proposed transaction is associated with a new stream of the genesis block—so as to flag that there is no precedent for the submitted revised file packet within the chain 332. If the approval node 350 rejects the proposed transaction, the proposed revision block and new stream is not hashed. Alternatively, if the approval node 350 accepts the proposed transaction, the proposed revision block becomes the initial revision block of a new stream in chain 332. In such a scenario, the associated file packet becomes the "initial" revised file packet of the new stream.

Figure 4:
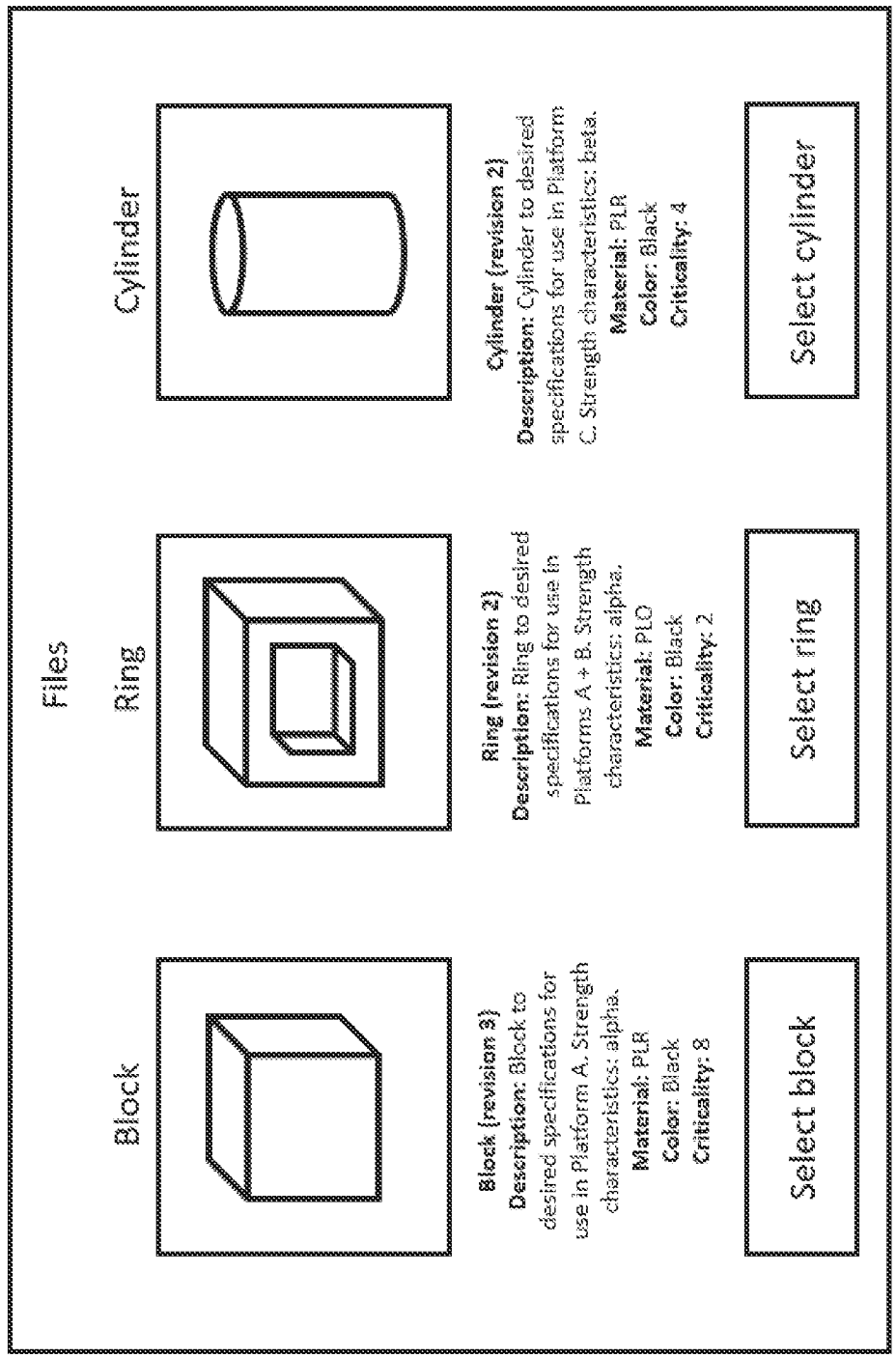
FIG. 4 is a catalog of parts of an approval-based distributed ledger system according to an example embodiment.

FIG. 4 is a catalog of parts of an approval-based distributed ledger system according to an example embodiment. The catalog of parts 400 is a GUI that displays to a user information collected from a fabrication node. The user is located at an end point in the approval-based distributed ledger system. The catalog of parts 400 illustrates all parts that are available for manufacturing at a respective end point. Manufacturing may be in the form of AM. The options available in the catalog of parts 400 may be filtered or limited based on: security settings; type of end point (vessel, office, etc.); and/or type of manufacturing device (e.g., AM printer). The catalog of parts 400 may display a name for a file packet and the revision number associated with the respective chain in a blockchain network. The catalog of parts 400 may also provide a description with relevant information about a desired part, such as appropriate platform, strength characteristics, or even dimensions. The catalog of parts 400 may display information directly from the file packet, such as geometric data, machine data, material data, and/or metadata. The catalog of parts 400 may also highlight various specification details. These may include, for example, material type, color, and criticality. The catalog of parts 400 may also include a virtual button to select or activate immediate AM printing at the end point.

Figure 5:
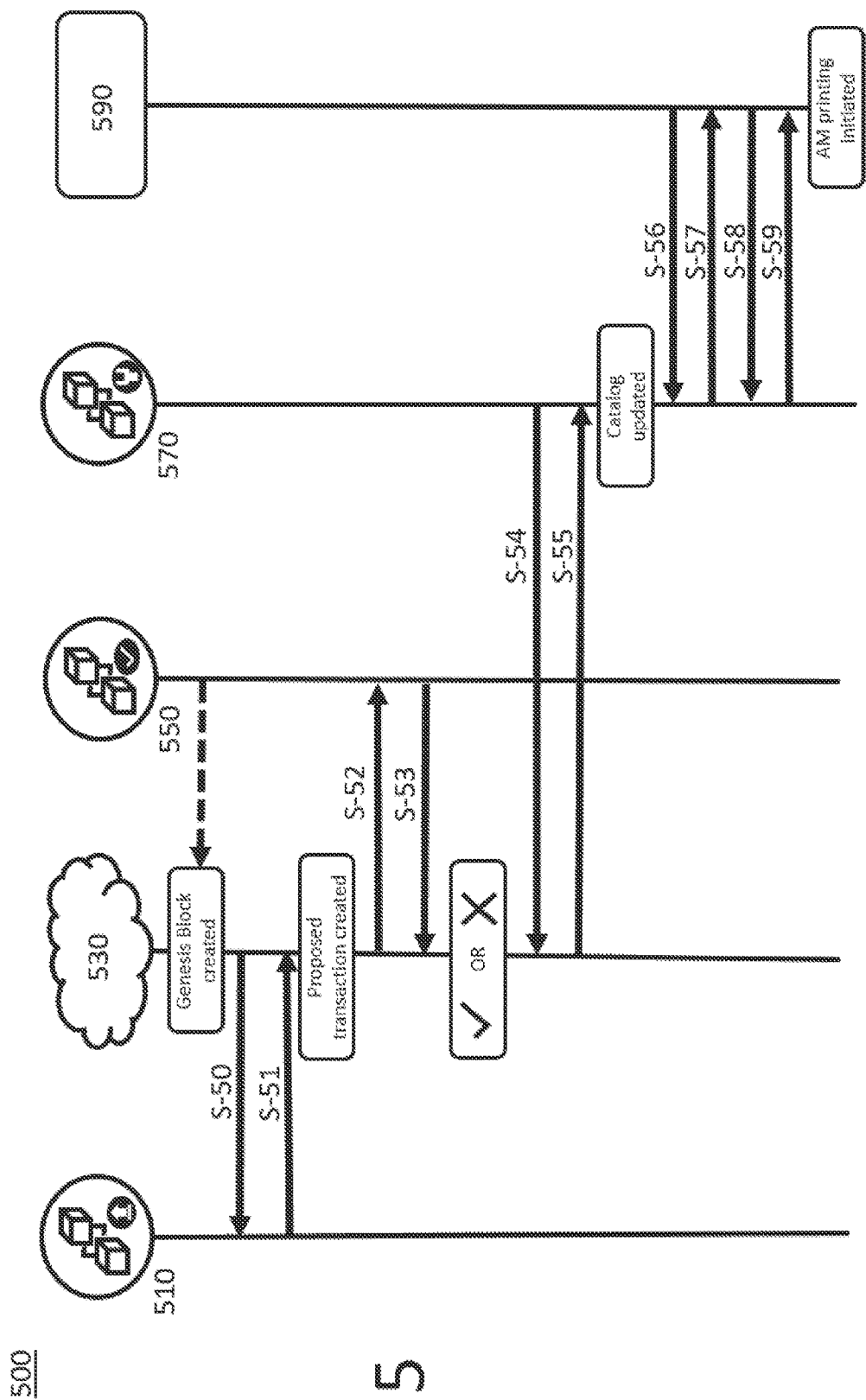
FIG. 5 is a procedure diagram of an approval-based distributed ledger system according to an example embodiment.

FIG. 5 is a procedure diagram of an approval-based distributed ledger system according to an example embodiment. As previously stated, each node in the approval-based distributed ledger system may be a single node or a plurality of nodes. For the sake of explanation, the example embodiments discussed below and illustrated in FIG. 5 will focus on each being a single node. The procedure diagram 500 may commence with the creation of a genesis block at the blockchain network 530. As stated previously, the genesis block may only be created by an approver via an approver node 550. The genesis block is associated with a particular part to be manufactured at an end point 590. The genesis block comprises a file packet with relevant data for the manufacture of the part. The procedure commences at S-50 when the submitter node 510 downloads the latest file packet for a part from the blockchain network 530. At this point, a user at the submitter node 510 prepares a revision to the file packet. The submitter node then, per S-51, sends a revision block with a revised file packet to the blockchain network 530. This new revision block is a proposed transaction to add to the chain and is parked in a memory pool. Next, in S-52, the blockchain network 530 may notify the approval node 550 that a proposed transaction has been added to the memory pool of a blockchain. In alternate embodiments, the approval node 550 may query the blockchain network 530 to obtain the same notification. Next, the approval node either rejects or approves the revised file packet, per S-53. If the revised file packet is rejected, then the proposed transaction is denied and the revision block is not added to the chain. Alternatively, if the file packet is approved by the approval node 550 through the delivery of a digital signature at S-53, then the proposed transaction is accepted and the revision block is added to the chain.

Next, in S-54 the fabrication node 570 reaches out to the blockchain network 530 for the latest version of the file packet based on the information in a respective chain. If the revision block has been added to the chain, then this latest version of the file packet will be delivered to fabrication node in S-55. The procedure diagram 500 assumes that the approval node 550 approved the proposed transaction.

Once the fabrication node 570 receives the latest file packet, it may update a catalog of parts. Next, at S-56 an end point 590 may query the fabrication node 570 to obtain a catalog of parts. The end point 590 may be a user or a computer program. The catalog of parts may then be sent to the end point 590 at S-57. At S-58, the end point 590 selects a desired part from the catalog and requests retrieval of the pertinent file packet from the fabrication node. The fabrication node may respond with the selected part file packet in S-59. The selected file packet may be specific to the manufacturing capabilities end point 590 (e.g., type of AM printer). After the pertinent packet is received, the AM printing process may be initiated. In some example embodiments, S-58 and S-59 may be skipped if the end point 590 downloads all file packets in a catalog during S-57.

Figure 6:
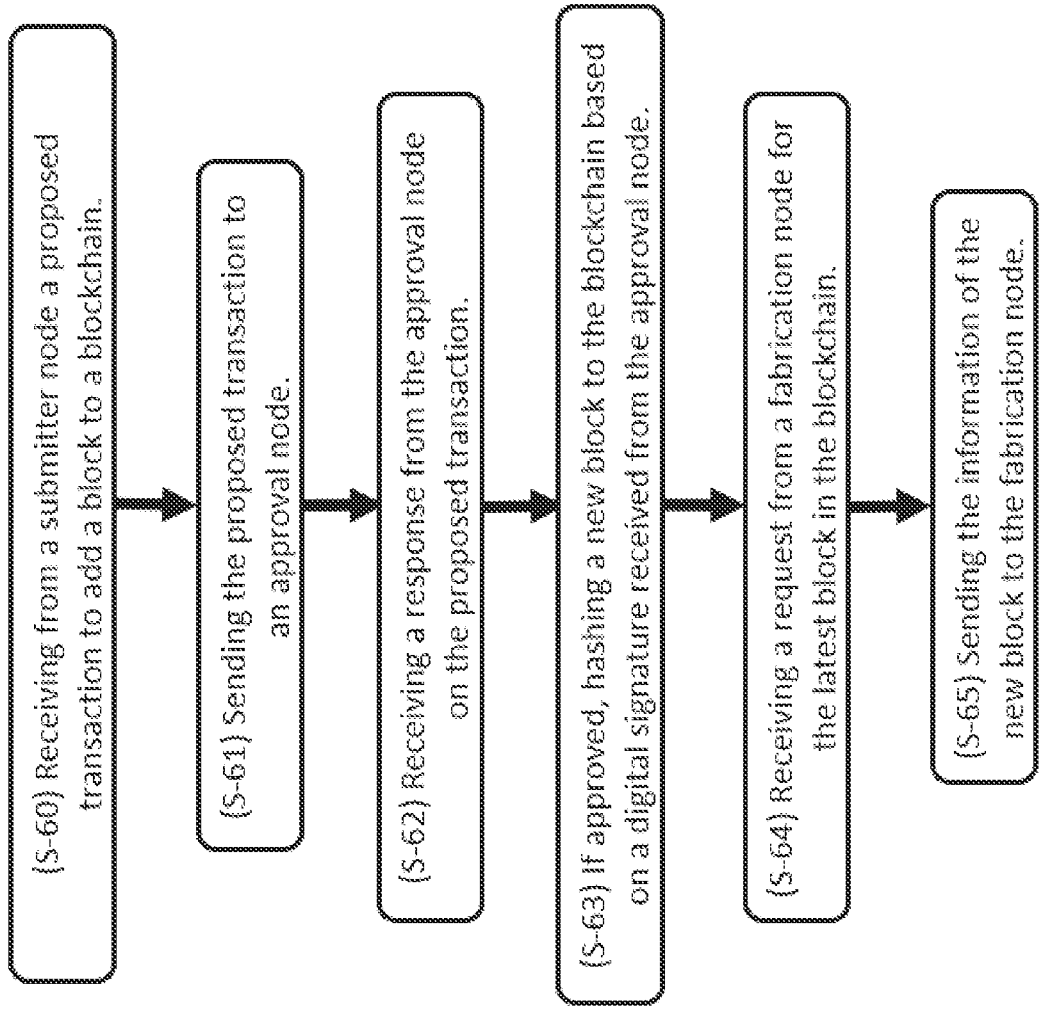
FIG. 6 is a flow diagram of an approval-based distributed ledger system according to an example embodiment.

FIG. 6 is a flow diagram of an approval-based distributed ledger system according to an example embodiment. The flow diagram 600 is from the perspective of a blockchain network. As previously stated, each node in the approval-based distributed ledger system may be a single node or a plurality of nodes. For the sake of explanation, the example embodiments discussed below and illustrated in FIG. 6 will focus on each being a single node. The flow diagram begins with (S-60) receiving a proposed transaction from a submitter node. The proposed transaction encompasses an associated revision block with a revised file packet corresponding to a part. The next step is (S-61) sending the proposed transaction to an approver node. The blockchain network then awaits to (S-62) receive a response from the approver node on the proposed transaction. If the proposed transaction is approved, the next step (S-63) is hashing a new block in the blockchain based on a digital signature from the approval node. This is followed by (S-64) receiving a request from a fabrication node for the latest block in the blockchain. At this point, the blockchain network (S-65) sends the requested information of the new block to the fabrication node, which the fabrication node processes as has been described above in previous figures.

The above described approval-based distributed ledger system offers significant advantages over the state of the art. It improves configuration control by requiring manufacturing directly from approved file packets in a blockchain. The blockchain containing a log of all files, file revisions, and the digital signature of all approvers. This significantly increases transparency and accountability. Also, tamper resistance is improved. File packets appended to the blockchain are secured via a robust asymmetric encryption algorithm (e.g., 256-bit), ensuring the part approved is the part that is manufactured. Insider threats are also minimized as users can define a number of approvers and the consensus criteria required for acceptance, reducing the impact of user error or malicious intent. Finally, the need for user training is reduced, as the data in the file packets are included on a blockchain in a transparent and automatic manner, reducing the knowledge barrier required for operators to produce the part.

Though the current implementation of an approval-based distributed ledger system utilizes multi-approval blockchain technology, the concept is equally applicable when using other distributed ledger systems. Also, though described as an additive manufacturing use case in the example embodiments, this approach is equally applicable to a wide range of other digital manufacturing systems via direct substitution of machine and material specific information in the blockchain. This may include, for example, Computer Numerically Controlled (CNC) machining, laser/plasma/waterjet cutting, robotic welding, Electrical Discharge Machining (EDM), and so on.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A distributed ledger system comprising:
    a ledger network configured to have various entry sequences, the ledger network comprising a blockchain network of computing devices, wherein a sequence is associated with an element intended for manufacturing and an entry in the sequence is associated with an element file packet comprising instructions for undertaking the manufacturing of the element on a manufacturing device;
    at least one submitter node configured to submit a proposed entry transaction to the ledger network, wherein the proposed entry transaction includes a revised element file packet, the revised element file packet comprising revised instructions for undertaking the manufacturing on the manufacturing device;
    at least one approval node configured to allow an external approver to review the proposed entry transaction and provide approval if threshold criteria are met;
    wherein,
    if the approval is provided by the at least one approval node, the proposed entry transaction and the revised element file packet become a latest entry and latest element file packet in the sequence, the latest element file packet comprising latest instructions for undertaking the manufacturing on the manufacturing device
    wherein the various entry sequences are a blockchain, the sequence is a chain, the entry is a block, the proposed entry transaction is a proposed block transaction, and the latest entry is a latest block,
    wherein a genesis block is an initial block in the chain, the genesis block contains an initial element file packet with initial instructions, the initial instructions comprising at least one of geometric data, machine data, material data, and metadata, such that the revised element file packet modifies the contents of the initial element file packet or a subsequent element file packet.

2. The distributed ledger system of claim 1, further comprising:
    at least one fabrication node configured to communicate with the ledger network and obtain the latest entry and the latest element file packet from the sequence, the at least one fabrication node comprising at least one computing device; and
    at least one end point configured to obtain the latest element file packet from the at least one fabrication node and undertake the manufacturing of the element, the at least one end point comprising at least one of a computing device and the manufacturing device.

3. The distributed ledger system of claim 2, wherein the at least one end point comprises a graphical user interface depicting at least one element and an indication of the latest element file packet available to undertake the manufacturing.

4. The distributed ledger system of claim 1, wherein the genesis block is created by the at least one approval node.

5. The distributed ledger system of claim 1, wherein the genesis block is configured to be associated with multiple streams within at least one block.

6. The distributed ledger system of claim 1, wherein the at least one submitter node is configured to download the element file packet, modify parameters in the element file packet, and submit the element file packet with the modified parameters as the revised element file packet.

7. The distributed ledger system of claim 1, wherein the at least one approval node provides the approval through use of at least one private key.

8. The distributed ledger system of claim 1, wherein the proposed entry transaction is temporarily added to a memory pool of the sequence until the at least one approval node provides the approval.

9. The distributed ledger system of claim 1, wherein the manufacturing is one of additive manufacturing, 3D printing, computer numerically controlled machining, laser cutting, plasma cutting, waterjet cutting, robotic welding, electrical discharge machining, and digital manufacturing system via direct substitution of machine and material specific information.

10. A distributed ledger manufacturing method comprising:
    submitting a proposed entry transaction to a ledger network configured to have various entry sequences, wherein a sequence is associated with an element intended for a manufacturing process and an entry in the sequence is associated with an element file packet comprising instructions for undertaking the manufacturing process of the element on a manufacturing device, wherein the proposed entry transaction includes a revised element file packet, the revised element file packet comprising revised instructions for undertaking the manufacturing process on the manufacturing device;
    reviewing, by at least one approval node with an external approver, the proposed entry transaction and providing approval if threshold criteria are met; and
    if the approval is provided by the at least one approval node, turning the proposed entry transaction and the revised element file packet into a latest entry and latest element file packet in the sequence, the latest element file packet comprising latest instructions for undertaking the manufacturing on the manufacturing device
    wherein the ledger network is a blockchain network, the various entry sequences are a blockchain, the sequence is a chain, the entry is a block, the proposed entry transaction is a proposed block transaction, and the latest entry is a latest block wherein a genesis block is an initial block in the chain, the genesis block contains an initial element file packet with initial instructions, the initial instructions comprising at least one of geometric data, machine data, material data, and metadata, such that the revised element file packet modifies the contents of the initial element file packet or a subsequent element file packet.

11. The distributed ledger manufacturing method of claim 10, further comprising:
    communicating with the ledger network and obtaining the latest entry and the latest element file packet from the sequence; and
    obtaining the latest element file packet from the at least one approval node and undertaking the manufacturing process of the element.

12. The distributed ledger manufacturing method of claim 11, wherein the genesis block is configured to be associated with multiple streams within at least one block.

13. The distributed ledger manufacturing method of claim 10, further comprising:
   downloading the element file packet, modifying parameters in the element file packet, and submitting the element file packet with the modified parameters as the revised element file packet.

14. The distributed ledger manufacturing method claim 10, wherein the reviewing step further comprises:
   providing the approval through use of at least one private key.

15. The distributed ledger manufacturing method of claim 10, wherein the proposed entry transaction is temporarily added to a memory pool of the chain until the at least one approval node provides the approval.

16. An approval-based blockchain method for manufacturing parts comprising:
   receiving a proposed transaction from at least one submitter node to add a latest block to a blockchain, wherein the blockchain corresponds to an element and each block comprises instructions for manufacturing the element on a manufacturing device, wherein the proposed transaction comprises updated instructions for manufacturing the element;
   sending the proposed transaction to at least one approval node with an external approver;
   receiving a response from the at least one approval node on the proposed transaction;
   if approved, hashing a new block to the blockchain based on the latest block and a digital signature received from the at least one approval node, the new block comprising the updated instructions for undertaking the manufacturing;
   receiving a request from at least one fabrication node for the new block in the blockchain; and
   sending the updated instructions of the new block to the at least one fabrication node for performing the manufacturing in at least one end point
   wherein the blockchain comprises a genesis block, the genesis block being an initial block in the blockchain, the genesis block containing an initial element file packet with initial instructions for the manufacturing of the element on the manufacturing device, the initial instructions comprising at least one of geometric data, machine data, material data, and metadata, such that the revised element file packet modifies the contents of the initial element file packet or a subsequent element file packet.

* * * * *